US012482248B2

(12) United States Patent
Liu et al.

(10) Patent No.: US 12,482,248 B2
(45) Date of Patent: Nov. 25, 2025

(54) MULTI-MODAL METHOD FOR CLASSIFYING THYROID NODULE BASED ON ULTRASOUND AND INFRARED THERMAL IMAGES

(71) Applicant: WUHAN UNIVERSITY, Wuhan (CN)

(72) Inventors: Juan Liu, Wuhan (CN); Na Zhang, Wuhan (CN)

(73) Assignee: WUHAN UNIVERSITY, Wuhan (CN)

( * ) Notice: Subject to any disclaimer, the term of this patent is extended or adjusted under 35 U.S.C. 154(b) by 261 days.

(21) Appl. No.: 18/516,124

(22) Filed: Nov. 21, 2023

(65) Prior Publication Data

US 2024/0282090 A1 Aug. 22, 2024

(30) Foreign Application Priority Data

Feb. 16, 2023 (CN) .......................... 202310131752.0

(51) Int. Cl.
*G06V 10/80* (2022.01)
*A61B 8/00* (2006.01)
(Continued)

(52) U.S. Cl.
CPC ............ *G06V 10/811* (2022.01); *A61B 8/085* (2013.01); *A61B 8/5223* (2013.01);
(Continued)

(58) Field of Classification Search
CPC .. G06V 10/811; G06V 10/806; G06V 10/778; G06V 20/70; G06V 10/7715;
(Continued)

(56) References Cited

U.S. PATENT DOCUMENTS 9,754,371 B2 * 9/2017 Kateb .................. A61B 5/0042
11,058,473 B2 * 7/2021 Zhang ..................... G06N 3/08
(Continued)

FOREIGN PATENT DOCUMENTS

CN      111382644 A  *  7/2020  ............. G06N 3/045
CN      114708236 A  *  7/2022  ............. G06N 3/045
(Continued)

OTHER PUBLICATIONS

Zhang et al., "An adaptive multi-modal hybrid model for classifying thyroid nodules by combining ultrasound and infrared thermal images" (pp. 1-18). Published Aug. 2023. (Year: 2023).*

*Primary Examiner* — Manav Seth

(74) *Attorney, Agent, or Firm* — Nields, Lemack & Frame, LLC

(57) ABSTRACT

The present disclosure provides a multi-modal method for classifying a thyroid nodule based on ultrasound (US) and infrared thermal (IRT) images. Based on ultrasound and infrared thermal images and in combination with a multi-modal learning method, the present disclosure provides an adaptive multi-modal hybrid (AmmH) model which is composed of three parts: an intra-modal hybrid encoder (HIME), an adaptive cross-modal encoder (ACME), and a multilayer perceptron (MLP) head. The HIME is capable of modeling a global feature while extracting a local feature. The ACME is capable of customizing personalized modality-weights according to different cases and performing information interaction and fusion of inter-modal features. The MLP head classifies a fused feature obtained. The method enables the AmmH model to automatically classify a thyroid nodule (Continued)

of a subject based on ultrasound and infrared thermal images of the subject, providing a doctor with an objective and accurate classification result to assist diagnosis.

20 Claims, 5 Drawing Sheets

(51) Int. Cl.
| | |
|---|---|
| *A61B 8/08* | (2006.01) |
| *G06T 7/00* | (2017.01) |
| *G06V 10/32* | (2022.01) |
| *G06V 10/77* | (2022.01) |
| *G06V 10/776* | (2022.01) |
| *G06V 10/778* | (2022.01) |
| *G06V 10/82* | (2022.01) |
| *G06V 20/70* | (2022.01) |
| *G16H 30/40* | (2018.01) |
| *G16H 50/20* | (2018.01) |

(52) U.S. Cl.
CPC .......... *A61B 8/5261* (2013.01); *G06T 7/0012* (2013.01); *G06V 10/32* (2022.01); *G06V 10/7715* (2022.01); *G06V 10/776* (2022.01); *G06V 10/778* (2022.01); *G06V 10/806* (2022.01); *G06V 10/82* (2022.01); *G06V 20/70* (2022.01); *G16H 30/40* (2018.01); *G16H 50/20* (2018.01); *G06T 2207/10048* (2013.01); *G06T 2207/10132* (2013.01); *G06T 2207/20081* (2013.01); *G06T 2207/30004* (2013.01); *G06V 2201/03* (2022.01)

(58) Field of Classification Search
CPC ...... G06V 10/32; G06V 10/82; G06V 10/776; G06V 2201/03; G16H 50/20; G16H 30/40; A61B 8/085; A61B 8/5223; A61B 8/5261; G06T 7/0012; G06T 2207/10048; G06T 2207/10132; G06T 2207/20081; G06T 2207/30004
See application file for complete search history.

(56) References Cited

U.S. PATENT DOCUMENTS

| | | | | |
|---|---|---|---|---|
| 11,439,308 | B2 * | 9/2022 | Ziegle | .................... G06T 7/0012 |
| 12,056,458 | B2 * | 8/2024 | Meng | ..................... G06F 40/205 |
| 12,315,142 | B2 * | 5/2025 | Gregson | .............. G06V 20/698 |
| 2024/0175847 | A1 * | 5/2024 | Fotkatzikis | .............. G06T 7/001 |
| 2024/0233341 | A1 * | 7/2024 | Amthor | ................... G06V 20/70 |
| 2025/0285718 | A1 * | 9/2025 | Planche | ................. G16H 10/60 |

FOREIGN PATENT DOCUMENTS

| | | | | | |
|---|---|---|---|---|---|
| CN | 114742796 | A | * | 7/2022 | ........... G06T 7/0012 |
| CN | 115187580 | A | * | 10/2022 | ........... G06V 10/774 |
| CN | 115620912 | A | * | 1/2023 | ............. G16H 50/50 |
| CN | 115662630 | A | * | 1/2023 | |
| LU | 502834 | B1 | * | 1/2023 | ............. G06N 3/088 |

* cited by examiner a. IRT image collection b. US image collection

Benign case a. Intra-modal Transformer

MULTI-MODAL METHOD FOR CLASSIFYING THYROID NODULE BASED ON ULTRASOUND AND INFRARED THERMAL IMAGES

CROSS REFERENCE TO RELATED APPLICATION

This patent application claims the benefit and priority of Chinese Patent Application No. 2023101317520, filed with the China National Intellectual Property Administration on Feb. 16, 2023, the disclosure of which is incorporated by reference herein in its entirety as part of the present application.

TECHNICAL FIELD

The present disclosure relates to automatic screening, analysis and classification of thyroid nodules in the crossing field of deep learning and medicine, and in particular, to a multi-modal method for classifying a thyroid nodule based on ultrasound (US) and infrared thermal (IRT) images.

BACKGROUND

The thyroid is located on a lower side in the front of the neck and is one of important glands in a human body, and thyroid hormones generated by the thyroid control the metabolism of the human body. The thyroid hormones have influence not only on a cholesterol level and a heart rate of a person but also on the mental state of the person. The normal function of the thyroid is the premise of each organ in the body to function normally. In recent years, the incidence of thyroid cancer has increased year by year. Initial symptoms of the thyroid cancer manifest as thyroid nodules occurring in the neck. The thyroid nodules may usually be distinguished between a benign nodule (non-cancerous nodule) and a malignant nodule (which may cause the thyroid cancer) by their characteristics. According to epidemiological data, the incidence of thyroid nodules in people is 19% to 68%, with only 5%-15% being malignant. For benign cases, there is no need to perform fine needle aspiration biopsy or an operation. By accurately analyzing whether a nodule is benign or malignant, not only can a risk for a patient be reduced, but also a medical cost can be significantly lowered.

The incidence of thyroid nodules in adults reaches 67%, and for most of them, the best detection technique for thyroid nodules should be noninvasive. In existing diagnosis methods for thyroid nodules, US detection has been considered as the most commonly used diagnosis method for clinically diagnosing thyroid diseases for its advantages, such as no radiation, non-invasion, good repeatability, and low cost. At present, many researchers have used US images to classify thyroid nodules based on a deep learning method. Soon et al. employed a transfer learning method to classify a thyroid nodule in a US image with a pre-trained deep learning model VGG16. Qing et al. utilized a deep learning algorithm Inception-v3 to distinguish between a benign thyroid nodule and a malignant thyroid nodule. These methods have achieved certain effects in the classification of thyroid nodules. However, these methods for classifying thyroid nodules are merely based on the US imaging modality. In actual clinical diagnosis, doctors tend to comprehensively utilize multi-modal medical data, such as clinical text data, image waveform data, and biological omics data, to diagnose patients more comprehensively and accurately. In recent years, another IRT imaging technique having the same characteristics of no radiation, non-invasion, and good repeatability with US imaging has also been used by researchers in detecting thyroid diseases. Helmy et al. used a cube as a neck model, established a prototype system with a surface value heat map, and verified the potential of a thermal image in thyroid tumor detection. Bahramian et al. from K.N. Toosi University of Technology in Teheran used an artificial neural network (ANN) to analyze a thermal image of the neck to distinguish between healthy thyroid tissue and cancer tissue. Fan Xueshuang et al. from Changchun Institute of optics, fine mechanics and physics, Chinese Academy of sciences conducted a multi-fractal feature research on dynamic infrared thermal images of healthy subjects under constant temperature and humidity conditions and performed statistic analysis and difference examination on multi-fractal feature parameters of the thyroids of different individuals, and research results indicated that temperature fluctuation details of the thyroids of healthy individuals exhibited a certain difference but a low amplitude and that the temperature fluctuated within $0.15°$ C. These researches demonstrate that the IRT imaging technique has a certain potential in detecting thyroid diseases. An US image and an IRT image may reflect information of a diseased region in the thyroid from different angles. The US image may reflect morphological information such as a size, boundary, morphology, aspect ratio, echo, calcification, and internal structure of a thyroid nodule, while the IRT image may reflect a temperature variation in the diseased region due to early metabolic changes and blood circulation changes. In a multi-modal learning task, when the data of one modality is interfered by noise, information provided by other modalities may assist correction. By integrating the consistency information from various modalities of data, the accuracy and robustness of decision-making can be improved. Moreover, there is a certain difference between data of different modalities collected by different instruments. That is, each modality may include information that is absent for other modalities while providing certain information for other modalities. By integrating the observation advantages of the data of different modalities and realizing complementation of information, more comprehensive semantic expression can be achieved, and the depth of understanding of the target task by the model can be improved. Therefore, it is very necessary to comprehensively utilize information from the US image and the IRT image based on a multi-modal learning method to realize more accurate classification of thyroid nodules. In this task, we are facing the following challenges: the first is how to enable the model to have a more sufficient feature expression capability, allowing for intra-modal high-level abstract feature expression; and the second is how to facilitate information interaction of inter-modal abstract features and reasonable feature fusion.

The deep learning method facilitates the development of multi-modal learning in the medical field. The deep learning method gains a higher-abstract level feature expression capability by screening and recombining low-dimensional features layer by layer. Inter-modal learning and fusion are significantly facilitated by combining a plurality of high-level abstract features of different modalities. In view of the powerful feature expression and fusion capability of the deep learning method, the deep learning method has become an important solution for heterogeneous data in increasingly complicated multi-modal learning. Since deep learning has been revitalized, convolutional neural networks (CNNs) have always been dominant in the field of computer vision.

A CNN can retain a relation between neighborhoods and local characteristics of space in an image, and uses three strategies, namely local receptive field, weight sharing, and downsampling, to reduce the complexity of the network model, and exhibits scaling invariance for variances in the form of translation, rotation, scaling, or the like. However, just because of this, the CNN lacks the capability of modeling global information in an image. In the last two years, a transformer based deep learning model is also applied to the field of computer vision and has achieved good effects. A self-attention (SA) mechanism is used in the transformer such that the model has the capability of learning a remote dependency and thus can model global information in an image better. A key factor influencing the capability of learning this dependency is a length of a path along which forward and backward signals in the network must pass. The shorter these paths between any combinations of positions in input and output sequences, the easier the learning of the remote dependency. In a CNN based model, the number of operations required by calculating a relation between two positions by convolution increases with distance, and the number of operations required by calculating a relation between two positions using the SA mechanism is distance-independent. A transformer-based model lacks inductive bias capabilities such as translation invariance and locality such that the model loses the capability of capturing a local feature. If the model can be combined with the advantages of local feature extraction and global modeling of the transformer in the CNN, the model can be allowed to have a more powerful feature expression capability and achieve richer intra-modal high-level feature expression.

In the multi-modal learning method, how to fuse high-level semantic features from different modalities has always been the focus of researchers. FUSion methods may be mainly divided into three types: input level fusion, feature level fusion, and decision level fusion. The currently most common fusion strategy is to directly connecting features from different modalities in series. Recently, researches have successively proposed other strategies for feature fusion, such as those using Kronecker product and orthogonal loss. However, all of these fusion strategies lack information interaction of features between different modalities.

In addition to this, in identification and classification of thyroid nodules, an ideal multi-modal model should take into consideration individual differences between different cases and generate a personalized modal weight strategy for a specific patient case, but there is currently no similar method disclosed yet.

SUMMARY

In view of the problem of using only a single modality in an existing method for identifying and classifying a thyroid nodule based on deep learning, the present disclosure provides a multi-modal method for classifying a thyroid nodule based on US and IRT images. In the method, in combination with the capability of a CNN in local feature expression and the advantage of a transformer in global information modeling, a hybrid encoder is constructed to fully extract an intra-modal feature. To enable reasonable and efficient feature fusion, an adaptive cross-modal encoder is designed in the present disclosure. The encoder is capable of information interaction of inter-modal high-level semantic features and of customizing personalized modality-weights according to different cases. In general, the method is capable of effectively extracting features related to a thyroid nodule from an US image and an IRT image and of reasonably fusing the features from the two different modalities, such that a finally obtained feature is capable of fully characterizing information related to thyroid nodule diagnosis. More accurate classification of a thyroid nodule can be realized, thus providing a more objective, accurate classification reference result for a doctor to assist diagnosis and helping improve the diagnosis efficiency and accuracy of the doctor.

The present disclosure provides the following technical solutions.

A multi-modal method for classifying a thyroid nodule based on US and IRT images includes the following steps:

S1: creating a multi-modal thyroid data set;

S2: constructing two hybrid intra-modal encoders (HIMEs) to extract features from an IRT image and a US image, respectively, where the two HIMEs are consistent in internal structure;

S3: constructing an adaptive cross-modal encoder (ACME) to perform adaptive feature fusion on the features of the IRT image and the US image obtained in S2;

S4: constructing a multilayer perceptron (MLP) head to classify a fused feature related to thyroid nodule diagnosis obtained in S3;

S5: combining the two HIMEs constructed in S2, the ACME constructed in S3, and the MLP head constructed in S4 into an adaptive multi-modal hybrid (AmmH) model;

S6: dividing the multi-modal thyroid data set into a training set, a validation set, and a test set in a certain ratio, defining a loss function and an optimizer, and defining a learning rate decreasing manner;

S7: iteratively training the AmmH model end to end for a plurality of times based on a back propagation algorithm, and taking a model parameter value with a highest classification accuracy rate on the test set as a final AmmH model parameter value for classifying a thyroid nodule; and S8: with preprocessed multi-modal data of thyroid (i.e., pairing data of the IRT image and the US image of thyroid) as an input to the AmmH model, outputting a classification result of the thyroid nodule.

Further, in step S1, the creating a multi-modal thyroid data set may specifically include the following steps:

S1.1: collecting IRT images and US images of thyroids of subjects, and acquiring thyroid nodule diagnosis results;

S1.2: preprocessing the collected IRT images and US images of thyroids for resizing into a consistent size; and S1.3: pairing the IRT images and the US images preprocessed in S1.2 as samples, and taking the thyroid nodule diagnosis results in S1.1 as sample labels to obtain the multi-modal thyroid data set.

Further, the constructing HIMEs in step S2 may specifically include the following steps:

S2.1: constructing an intra-modal convolutional encoder (CE) to extract a feature from a single modality, thereby obtaining an intra-modal local feature expressed as follows:

$$F_m^{local} = E_m^{Conv}(I_m)$$

where m represents an imaging modality, m∈{IRT, US}; $F_m^{local}$ represents the intra-modal local feature of modality m; $E_m^{Conv}$ represents the intra-modal CE corresponding to modality m; $I_m$ represents an image of modality m; $I_m \in R^{C*H*W}$; $F_m^{local} \in R^{C'*H'*W'}$; C, H, and W represent the number of channels, a height, and a width of the image of modality m; and C', H', and W' represent the number of channels, a height, and a width of a feature map of local features of modality m;

S2.2: constructing a feature embedding layer (FEL) for the purpose of bridging a CE to a transformer encoder: firstly performing a deconvolution operation on the feature map obtained in S2.1 to obtain a desired number and size; then performing a flattening operation on obtained two-dimensional feature maps to obtain one-dimensional token sequences required by an input to the transformer encoder; and adding positional encoding (PE) to the obtained token sequences because spatial information which is very important for an image is lost due to the flattening operation, thereby obtaining a final one-dimensional token sequence expressed as follows:

$$F_m^{token} = \text{Flatten}(Deconv_m(F_m^{local})) + PE_m$$

where $F_m^{token}$ represents the one-dimensional token sequence processed by the FEL as the input to the transformer encoder; Flatten represents the flattening operation; $Deconv_m$ represents the deconvolution operation for modality m; $PE_m$ represents PE for modality m; $F_m^{token} \in R^{C''*H''*W''}$, $PE_m \in R^{C''*H''*W''}$; and C" and H"W" represent the number of the one-dimensional token sequences and dimensions corresponding to modality m, respectively; and S2.3: constructing an intra-modal transformer encoder (TE) to perform global modeling on the local features processed by the FEL in S2.2 and to establish a long-distance dependency relationship, where the intra-modal TE is composed of L1 intra-modal transformer blocks; each intra-modal transformer block is composed of the following four parts: a layer normalization (LN) layer, an SA layer, an LN layer, and an MLP layer; and the MLP is composed of two fully connected layers with Gaussian error linear units (GELU) activation functions; and obtaining a high-level abstract semantic feature with global context information and local information through the IMTE, expressed as follows:

$$F_m = MLP_m(LN(Z_m)) + Z_m, Z_m = SA_m(LN(F_m^{token})) + F_m^{token}$$

where $F_m$ represents the high-level abstract semantic feature of modality m finally obtained by the HIME: $MLP_m$ represents the MLP layer; $Z_m$ represents calculation of an intermediate variable; $SA_m(\cdot)$ represents SA calculation; and $F_m \in R^{C''*H''*W''}$.

Still further, in step S2.3, formulas for the SA calculation in the SA layer are as follows:

$$Q_m = W_m^Q * LN(F_m^{token})$$
$$K_m = W_m^K * LN(F_m^{token})$$
$$V_m = W_m^V * LN(F_m^{token})$$

-continued $$SA_m = \text{softmax}\left(\frac{Q_m K_m^T}{\sqrt{d_k}}\right) V_m$$

where $Q_m$, $K_m$, and $V_m$ represent a query vector, a key vector, and a value vector needed by the SA calculation, respectively: $W_m^Q$, $W_m^K$, and $W_m^V$ are all learnable parameters; $LN(\cdot)$ represents layer normalization; T represents transposition of a matrix; $d_k$ represents dimensions of the query vector $K_m$; and a calculation formula for softmax($\cdot$) is $$\text{softmax}(x) = \frac{e^x}{\sum_{i=1}^{k} e_i^x},$$

where e is a natural constant, and k represents dimensions of vector x.

Further, the constructing an ACME in step S3 may specifically include the following steps:

S3.1: constructing an adaptive modality-weight generation (AMWG) network for customizing a different modality-weight for each case according to actual case situations, where the AMWG network is an MLP which is composed of three fully connected layers with rectified linear unit (ReLU) activation functions; to reduce repeated calculation and accelerate convergence, an input thereto is the high-level abstract semantic feature $F_m$ of each modality m obtained in step S2.3, and an output is an optimal weight customized for each modality $w_m$; and an AMWG operation process is expressed as follows:

$$(w_{US}, w_{IRT}) = \text{softmax}(MLP_{AMWG}([F_{US}, F_{IRT}]))$$

where $w_{US}$ and $W_{IRT}$ represent optimal modality-weights corresponding to modalities US and IRT; $F_{US}$ and $F_{IRT}$ represent the high-level abstract semantic features of the modalities US and IRT, respectively; [•,•] represents a splicing operation; softmax(•) indicates operation results in $W_{US}+W_{IRT}=1$; and $MLP_{AWMG}$ represents an MLP composed of three fully connected layers with ReLU activation functions;

S3.2: constructing an inter-modal transformer encoder (TE) for performing information interaction and adaptive feature fusion on the features from different modalities obtained in S2 and the customized modality-weights obtained in S3.1, specifically including:

firstly introducing a learnable parameter vector cls token as a final classification feature, and adding PE as an input to the inter-modal TE, expressed as follows:

$$F^{token} = [cls\ token,\ w_{US} * F_{US} - w_{IRT} * F_{IRT}] + PE$$

where $F^{token} \in R^{(C''+1)*H''W''}$; and the inter-modal TE is composed of L2 inter-modal blocks; each inter-modal block is composed of an LN layer, a multi-headed self-attention (MSA) layer, an LN layer, and an MLP layer; and the MLP layer is composed of two fully connected layers with Gaussian error linear unit (GELU) activation functions.

Still further, in step S3.2, formulas for SA calculation in the MSA layer are as follows:

$$Q^i = W^{Q^i} LN(F^{token})$$
$$K^i = W^{K^i} LN(F^{token})$$
$$V^i = W^{V^i} LN(F^{token})$$
$$head^i = SA^i = \text{softmax}\left(\frac{Q^i * K^{i^T}}{\sqrt{d_{k^i}}}\right) V^i$$
$$MSA = W^o[head^1, head^2 \ldots head^N]$$
$$F = MLP(LN(Z)) + Z, Z = MSA(LN(F^{token})) + F^{token}$$

where $Q^i$, $K^i$, and $V^i$ represent a query vector, a key vector, and a value vector needed by the SA calculation of the ith head, respectively; $W^{Q^i}$, $W^{K^i}$, $W^{V^i}$, and $W^o$ are all learnable parameters; LN(•) represents layer normalization; $head^i$ and $SA^i$ represent an SA calculation result of the ith head; $d_{k^i}$ represents dimensions of the query vector $K^i$; and $F \in R^{(C''+1)*H''W''}$.

Further, the constructing an MLP head in step S4 may include the following steps:

S4.1: taking a value F[0] of a first position in the feature vector F obtained in step S3 as an input to the MLP head; and S4.2: constructing the MLP head which is a fully connected layer with the ReLU activation function; inputting F[0], and outputting the classification result, expressed as follows:

cls=MLP Head(F[0])

where cls is a classification class finally obtained, cls ∈ {benign, malignant}.

Further, the loss function in step S6 may be cross entropy (CE) Loss, which is defined as follows:

$$CE\ Loss = -[y\log(y') + (1-y)\log(1-y')]$$

where y represents a true label for a sample, and y' represents a predicted label.

Further, in step S6, the optimizer may be configured to update and calculate a network parameter that affects model training and model output, such that the network parameter approaches or reaches an optimal value, thereby minimizing or maximizing the loss function; and the learning rate decreasing manner may refer to a learning rate decreasing with an increased number of training iterations to help model convergence.

Further, the preprocessing in step S8 is performed in a same way as that mentioned in S1.2.

The present disclosure also provides a multi-modal system for classifying a target subject based on ultrasound and infrared thermal images, including a processor and a memory having program codes containing an adaptive multi-modal hybrid (AmmH) model stored therein.

The AmmH model includes two hybrid intra-modal encoders (HIMEs) configured to extract features from an infrared thermal (IRT) image and an ultrasound (US) image respectively; an adaptive cross-modal encoder (ACME) configured to perform adaptive feature fusion on the features of the IRT image and the US image; and a multilayer perceptron (MLP) head configured to classify the fused feature, and the processor performs the stored program codes to:

S1: receiving a multi-modal data set of a plurality of subjects, the multi-modal data set including IRT images and US images;

S2: dividing the multi-modal data set into a training set, a validation set, and a test set in a certain ratio, defining a loss function and an optimizer, and defining a learning rate decreasing manner;

S3: iteratively training the AmmH model end to end for a plurality of times using the training set based on a back propagation algorithm, and taking a model parameter value with a highest classification accuracy rate on the test set as a final AmmH model parameter value for classification; and S4: receiving and preprocessing multi-modal data of a target subject, wherein the multi-modal data of the target subject include IRT images and US images; and inputting the preprocessed multi-modal data to the trained AmmH model for classification to obtain a category of the target subject.

The present disclosure has the following beneficial effects:

(1) The present disclosure provides a multi-modal method for classifying a thyroid nodule based on US and IRT images, which uses two imaging techniques—US imaging technique and IRT imaging technique—to obtain a US image and an IRT image of the thyroid of a patient. A multi-modal learning model is constructed to learn features related to thyroid nodule diagnosis in the US image and the IRT image in combination, achieving a higher accuracy rate in thyroid nodule classification than a single-modal method.

(2) In the present disclosure, the hybrid intra-modal encoder (HIME) is used for extract a feature of a single-modal image, which is implemented by bridging the intra-modal CE and the intra-modal TE with the FEL. Thus, the HIME is combined with the advantages (e.g., inductive bias capabilities such as translation invariance) of the CNN in extracting a local feature of an image and the global modeling capability thereof of establishing the long-distance dependency relationship by the transformer based on SA, and thus is caused to have more powerful feature extraction capability.

(3) In the present disclosure, an adaptive cross-modal encoder (ACME) is designed for fusion features from two different modalities. The ACME is composed of the AMWG network and the inter-modal TE. The AMWG network takes into full consideration differences between individuals, and adaptively gives customized personalized modality-weights according to actual situations of different cases. The introduction of the inter-modal TE further realizes information interaction between features of two modalities. The AMWG network and the inter-modal TE allow for more reasonable and efficient fusion of features of two modalities.

DETAILED DESCRIPTION OF THE EMBODIMENTS

The technical solutions in embodiments of the present disclosure will be clearly and completely described below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative efforts shall fall within the protection scope of the present disclosure.

EXAMPLES

Figure 1:
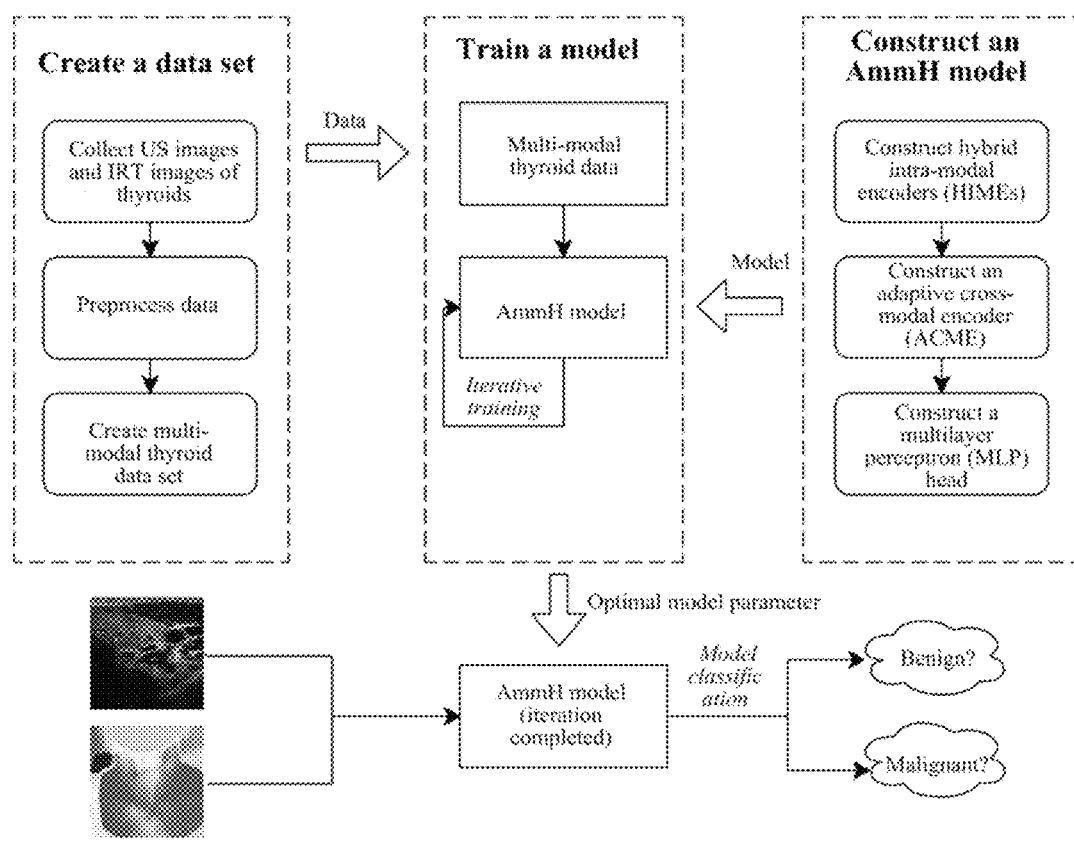
FIG. 1 is a work flow chart of classifying a thyroid nodule based on multi-modal images in the present disclosure.
Figure 2:
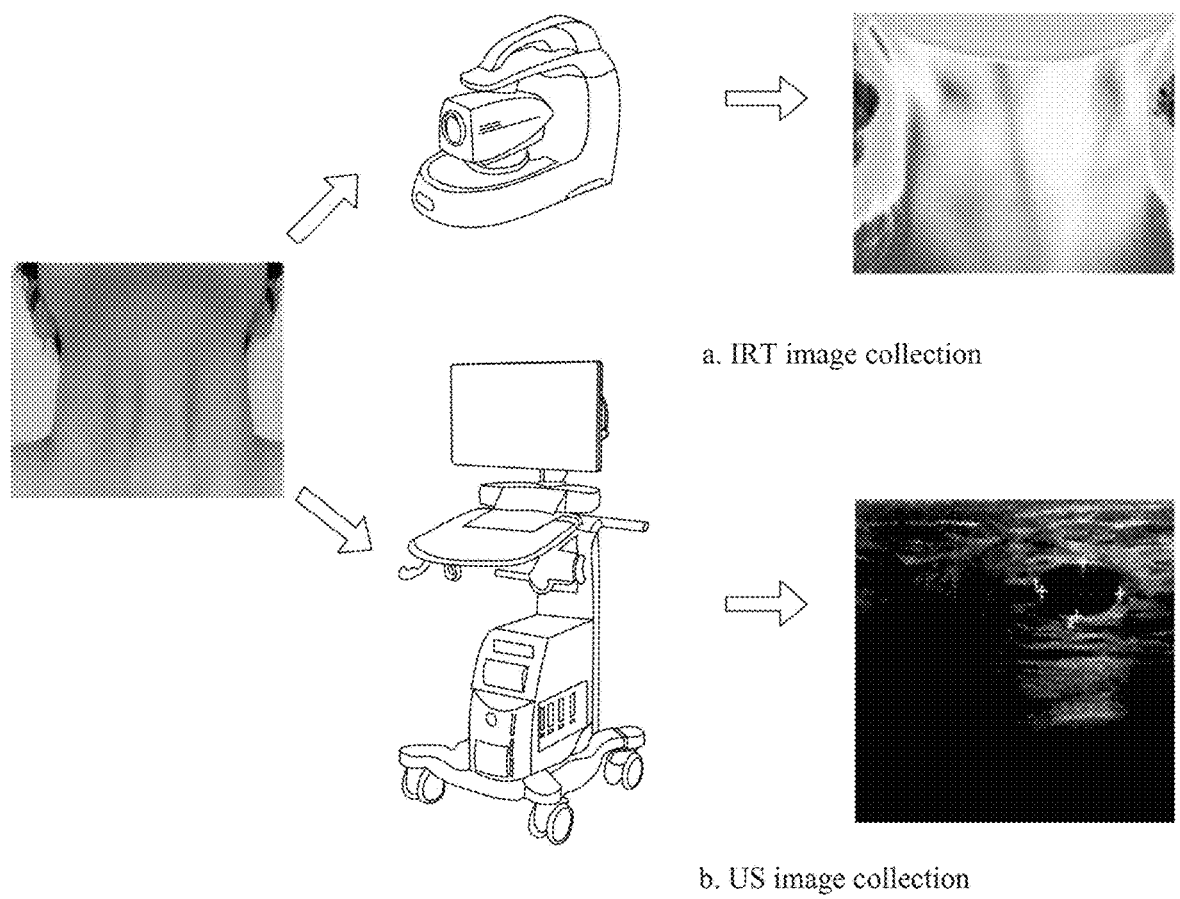
FIG. 2 is a flowchart of data collection in the present disclosure.
Figure 3A:
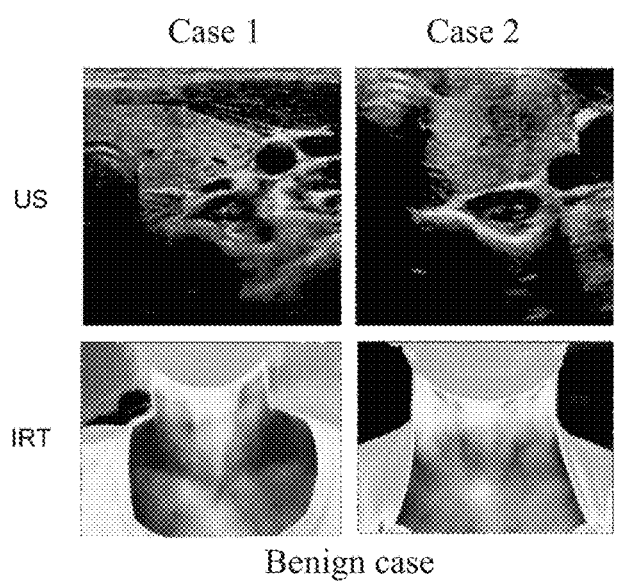
FIGS. 3A-B illustrate benign and malignant case data examples in a multi-modal thyroid data set created in the present disclosure.
Figure 3B:
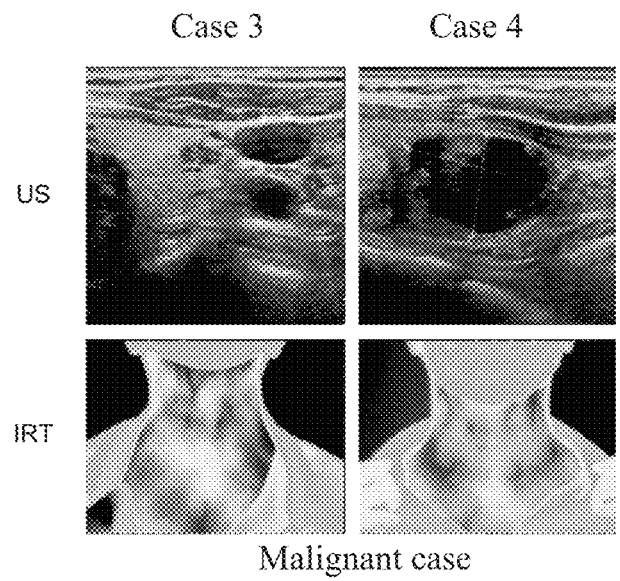

The present disclosure provides a multi-modal method for classifying a thyroid nodule based on US and IRT images, of which a work flow chart is as shown in FIG. 1, including the following steps:

S1: a multi-modal thyroid data set is created. A flowchart of collecting thyroid data is as shown in FIG. 2, and benign and malignant case data examples in the multi-modal thyroid data set are as shown in FIGS. 3A-B.

S2: two hybrid intra-modal encoders (HIMEs) are constructed to extract features from an IRT image and a US image, respectively. The two hybrid encoders are consistent in internal structure.

S3: an adaptive cross-modal encoder (ACME) is constructed to perform adaptive feature fusion on the features of the IRT image and the US image obtained in S2.

S4: a multilayer perceptron (MLP) head is constructed to classify a fused feature related to thyroid nodule diagnosis obtained in S3.

Figure 4:
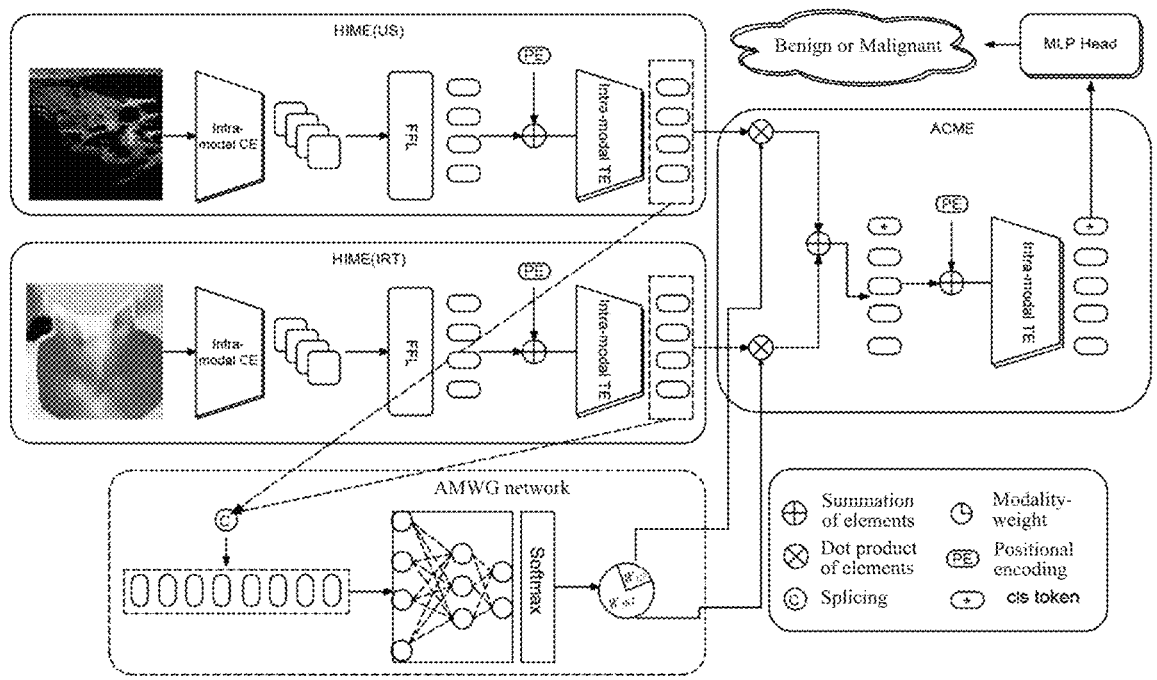
FIG. 4 illustrates an overview of an adaptive multi-modal hybrid (AmmH) model in the present disclosure.

S5: the two HIMEs constructed in S2, the ACME constructed in S3, and the MLP head constructed in S4 are combined into an adaptive multi-modal hybrid (AmmH) model. An overview of the AmmH model is as shown in FIG. 4.

S6: the multi-modal thyroid data set into a training set, a validation set, and a test set in a certain ratio, and a loss function and an optimizer, and a learning rate decreasing manner are defined. Specifically, a dividing ratio of the multi-modal data set in the present example is as follows: the training set:the validation set:the test set=6:2:2.

S7: the AmmH model is iteratively trained end to end for a plurality of times based on a back propagation algorithm, and a model parameter value with a highest classification accuracy rate on the test set is taken as a final AmmH model parameter value for classifying a thyroid nodule. Specifically, a total number of rounds of training in the present example is set as 200, and a size of a training batch is set as 32.

S8: with preprocessed multi-modal data of thyroid (i.e., pairing data of the IRT image and the US image of thyroid) as an input to the AmmH model, a classification result of the thyroid nodule is output. Specifically, the classification result of the thyroid nodule in the present example is divided into a benign type and a malignant type.

Further, in step S1, the creating a multi-modal thyroid data set specifically includes the following steps:

S1.1: IRT images and US images of thyroids of subjects are collected, and thyroid nodule diagnosis results are acquired.

S1.2: the collected IRT images and US images of thyroids are preprocessed and resized into a consistent size. Specifically, the IRT images and the US images are uniformly resized into 224*224 in the present example.

S1.3: the IRT images and the US images preprocessed in S1.2 are paired as samples, and the thyroid nodule diagnosis results in S1.1 are taken as sample labels to obtain the multi-modal thyroid data set. Specifically, the sample labels in the present example include benign and malignant types.

Further, the constructing HIMEs in step S2 specifically comprises the following steps:

S2.1: an intra-modal convolutional encoder (CE) is constructed to extract a feature from a single modality, thereby obtaining an intra-modal local feature expressed as follows:

$$F_m^{local} = E_m^{Conv}(I_m)$$

where m represents an imaging modality, m ∈ {IRT, US}; $F_m^{local}$ represents the intra-modal local feature of modality m; $E_m^{Conv}$ represents the intra-modal CE corresponding to modality m; $I_m$ represents an image of modality m; $I_m \in R^{C*H*W}$; $F_m^{local} \in R^{C'*H'*W'}$; C, H, and W represent the number of channels, a height, and a width of the image of modality m; and C', H', and W' represent the number of channels, a height, and a width of a feature map of local features of modality m. Specifically, in the present example, C=3, H=224, and W=224; C'=512, H'=8, and W'=8.

Specifically, the convolutional encoder (CE) in the present example uses a basically same network structure to a residual network model ResNet18, with an only difference that global average pooling layer and a fully connected layer in the ResNet18 are removed in the present example.

S2.2: a feature embedding layer (FEL) is constructed for the purpose of bridging a CE to a transformer encoder. Firstly, a deconvolution operation is performed on the feature map obtained in S2.1 to obtain a desired number and size. A flattening operation is then performed on obtained two-dimensional feature maps to obtain one-dimensional token sequences required by an input to the transformer encoder; and positional encoding (PE) is added to the obtained token sequences because spatial information which is very important for an image is lost due to the flattening operation. A final one-dimensional token sequence is obtained, which is expressed as follows:

$$F_m^{token} = \mathrm{Flatten}(Deconv_m(F_m^{local})) + PE_m$$

where $F_m^{token}$ represents the one-dimensional token sequence processed by the FEL as the input to the transformer encoder; Flatten represents the flattening operation; $Deconv_m$ represents the deconvolution operation for modality m; $PE_m$ represents PE for modality m; $F_m^{token} \in R^{C''*H''W''}$, $PE_m \in R^{C''*H''W''}$; and C" and H"W" represent the number of the one-dimensional token sequences and dimensions corresponding to modality m, respectively. Specifically, in the present example, C"=196, and H"W"=576.

S2.3: an intra-modal transformer encoder (TE) is constructed to perform global modeling on the local features processed by the FEL in S2.2 and to establish a long-distance dependency relationship. The intra-modal TE is composed of Li intra-modal transformer blocks. Each intra-modal transformer block is composed of the following four parts: a layer normalization (LN) layer, an SA layer, an LN layer, and an MLP layer. The MLP is composed of two fully connected layers with Gaussian error linear units (GELU) activation functions. Specifically, in the present example, L1=4. Formulas for the SA calculation in the SA layer are as follows:

$$Q_m = W_m^Q * LN(F_m^{token})$$

$$K_m = W_m^K * LN(F_m^{token})$$

$$V_m = W_m^V * LN(F_m^{token})$$

$$SA_m = softmax\left(\frac{Q_m K_m^T}{\sqrt{d_k}}\right) V_m$$

where $Q_m$, $K_m$, and $V_m$ represent a query vector, a key vector, and a value vector needed by the SA calculation, respectively; $W_m^Q$, $W_m^K$, and $W_m^V$ are all learnable parameters; LN(•) represents layer normalization; T represents transposition of a matrix; $d_k$ represents dimensions of the query vector $K_m$; and a calculation formula for softmax(•) is $$softmax(x) = \frac{e^x}{\sum_{i=1}^{k} e_i^x},$$

where e is a natural constant, and k represents dimensions of vector x. Specifically, in the present example, k=576.

A high-level abstract semantic feature with global context information and local information is obtained through the IMTE, expressed as follows:

$$F_m = MLP_m(LN(Z_m)) + Z_m, Z_m = SA_m(LN(F_m^{token})) + F_m^{token}$$

where $F_m$ represents the high-level abstract semantic feature of modality m finally obtained by the HIME; $MLP_m$ represents the MLP layer; $Z_m$ represents calculation of an intermediate variable; $SA_m(•)$ represents SA calculation; and $F_m \in R^{C''*H''W''}$.

Further, the constructing an ACME in step S3 specifically includes the following steps:

S3.1: an adaptive modality-weight generation (AMWG) network is constructed for customizing a different modality-weight for each case according to actual case situations. An AMWG module is an MLP which is composed of three fully connected layers with rectified linear unit (ReLU) activation functions, to reduce repeated calculation and accelerate convergence, an input thereto is the high-level abstract semantic feature $F_m$ of each modality m obtained in step S2.3, and an output is an optimal weight customized for each modality $w_m$. An AMWG operation process is expressed as follows:

$$(w_{US}, w_{IRT}) = softmax(MLP_{AMWG}([F_{US}, F_{IRT}]))$$

where $w_{US}$ and $W_{IRT}$ represent optimal modality-weights corresponding to modalities US and IRT; $F_{US}$ and $F_{IRT}$ represent the high-level abstract semantic features of the modalities US and IRT, respectively; [,] represents a splicing operation; softmax(•) operation results in $w_{US}+W_{IRT}=1$; and $MLP_{AMWG}$ represents an MLP composed of three fully connected layers with ReLU activation functions.

S3.2: an inter-modal transformer encoder (TE) is constructed for performing information interaction and adaptive feature fusion on the features from different modalities obtained in S2 and the customized modality-weights obtained in S3.1. Firstly, we introduce a learnable parameter vector cls token as a final classification feature, and add PE as an input to the inter-modal TE, expressed as follows:

$$F^{token} = [cls\ token, w_{US} * F_{US} + w_{IRT} * F_{IRT}] + PE$$

where $F^{token} \in R^{(C''+1)*H''W''}$.

Figure 5A:
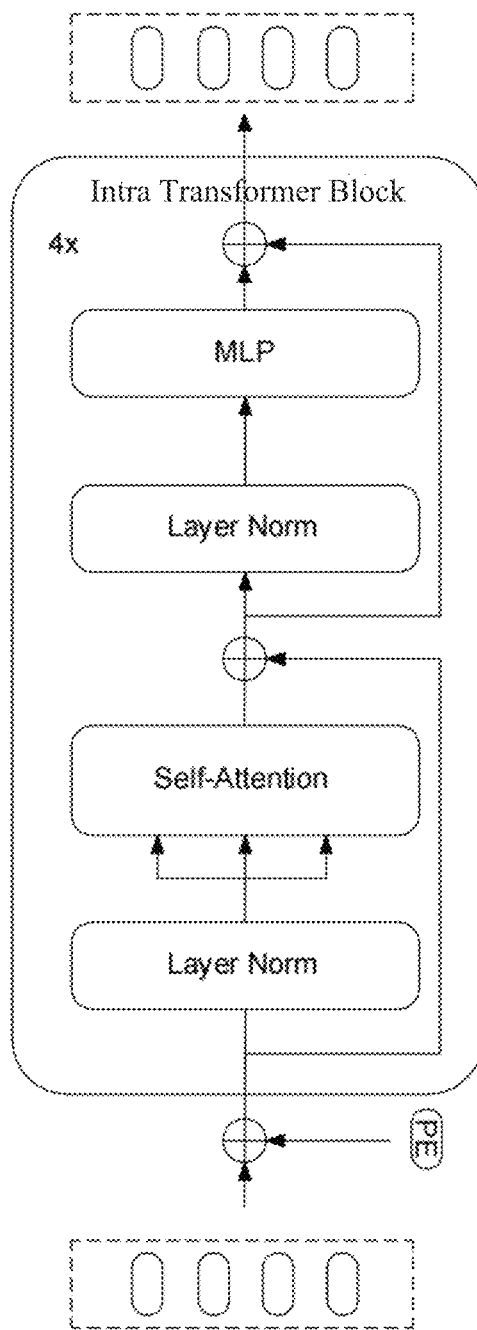
FIGS. 5A-B are diagram illustrating comparison between an intra-modal transformer block in a hybrid intra-modal encoder (HIME) and an inter-modal transformer block in an adaptive cross-modal encoder (ACME).
Figure 5B:
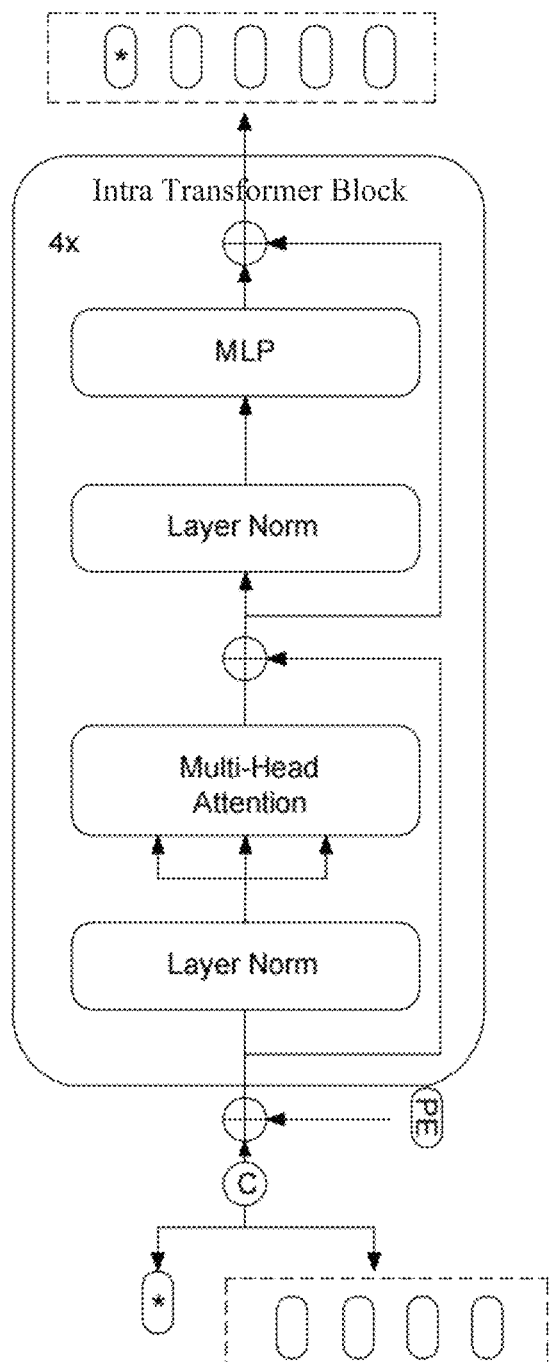

The inter-modal TE is composed of L2 inter-modal blocks. Each inter-modal block is composed of an LN layer, a multi-headed self-attention (MSA) layer, an LN layer, and an MLP layer. The MLP layer is composed of two fully connected layers with Gaussian error linear unit (GELU) activation functions. A diagram illustrating comparison between the intra-modal transformer block in the HIME and the inter-modal transformer block in the ACME is as shown in FIGS. 5A-B. Specifically, in the present example, L2=4. Formulas for SA calculation in the MSA layer are as follows:

$$Q^i = W^{Q^i} LN(F^{token})$$

$$K^i = W^{K^i} LN(F^{token})$$

$$V^i = W^{V^i} LN(F^{token})$$

$$head^i = SA^i = softmax\left(\frac{Q^i + K^{iT}}{\sqrt{d_{k^i}}}\right) V^i$$

$$MSA = W^0[head^1, head^2 \ldots head^N]$$

$$F = MLP(LN(Z)) + Z, Z = MSA(LN(F^{token})) + F^{token}$$

where $Q^i$, $K^i$, and $V^i$ represent a query vector, a key vector, and a value vector needed by the SA calculation of the ith head, respectively: $W^{Q^i}$, $W^{K^i}$, $W^{V^i}$, and $W^o$ are all learnable parameters; head and $SA^i$ represent an SA calculation result of the ith head; $d_{k^i}$ represents dimensions of the query vector $K^i$; and $F \in R^{(C''+1)*H''W''}$. Specifically, in the present example, $d_{k^i}=576$; and the number of heads is 8.

Further, the constructing an MLP head in step S4 includes the following steps:

S4.1: a value F[0] of a first position in the feature vector F obtained in step S3 is taken as an input to the MLP head.

S4.2: the MLP head is constructed, which is a fully connected layer with the ReLU activation function. After F[0] is input, the classification result is output, expressed as follows:

$$cls = MLP\ Head(F[0])$$

where cls is a classification class finally obtained, cls∈ {benign, malignant}; and F[0] is the value F[0] of the first position in the feature vector F obtained in step S3.

Further, the loss function in step S6 is cross entropy (CE) Loss, which is defined as follows:

$$CE\ Loss = -[y\log(y') + (1-y)\log(1-y')] \quad 5$$

where y represents a true label for a sample, and y' represents a predicted label.

Further, in step S6, the optimizer is configured to update and calculate a network parameter that affects model training and model output, such that the network parameter approaches or reaches an optimal value, thereby minimizing (or maximizing) the loss function. Specifically, Adam optimizer is used in the present example.

Further, in step S6, the learning rate decreasing manner refers to a learning rate decreasing with an increased number of training iterations to help model convergence. Specifically, a cosine annealing learning rate decreasing manner is used in the present example. An initial learning rate is set as 1e-3, and a minimal learning rate as 1e-4.

Further, the preprocessing in step S8 is performed in a same way as that mentioned in S1.2. Specifically, the IRT images and the US images are uniformly resized into a size of 224*224.

Most existing methods for classifying thyroid nodules based on deep learning are based on only single-modal US images because US imaging has excellent characteristics such as non-invasion, low cost, and ease of acquisition. An US image and an IRT image may provide information for thyroid nodule diagnosis from different angles. For example, the US image may provide morphological information such as a size, shape, aspect ratio, edge, and calcification of a lesion region, while the IRT image may provide metabolic information indicated by the lesion region due to temperature variations. Such information complements each other. A more accurate thyroid nodule classification result can be provided by learning the features related to the thyroid nodule in the images of the two modalities in combination based on the multi-modal learning method to assist diagnosis. The multi-modal model provided in the present disclosure is combined with the capability of a CNN in local feature expression and the advantage of a transformer in global information modeling such that a hybrid encoder is constructed to fully extract an intra-modal feature. Moreover, to enable reasonable and efficient feature fusion, an adaptive cross-modal encoder is designed in the present disclosure. The encoder is capable of information interaction of inter-modal high-level semantic features and of customizing personalized modality-weights according to different cases. In general, the method is capable of effectively extracting features related to a thyroid nodule from an US image and an IRT image and of reasonably fusing the features from the two different modalities, such that a finally obtained feature is capable of fully characterizing information related to thyroid nodule diagnosis. More accurate classification of a thyroid nodule can be realized, providing an objective, accurate reference for a doctor to assist diagnosis.

The foregoing are merely descriptions of the specific embodiments of the present disclosure, and the protection scope of the present disclosure is not limited thereto. Any modification, equivalent replacement, improvement, etc. made within the technical scope of the present disclosure by those skilled in the art shall be included within the protection scope of the present disclosure.

What is claimed is:

1. A multi-modal method for classifying a subject based on ultrasound and infrared thermal images, comprising the following steps:
   S1: collecting a multi-modal data set of a plurality of subjects, the multi-modal data set comprising infrared thermal (IRT) images and ultrasound (US) images;
   S2: constructing two hybrid intra-modal encoders (HIMEs) to extract features from an IRT image and an US image of each subject, respectively;
   S3: constructing an adaptive cross-modal encoder (ACME) to perform adaptive feature fusion on the features of the IRT image and the US image;
   S4: constructing a multilayer perceptron (MLP) head to classify a fused feature related to the subject obtained in S3;
   S5: combining the HIMEs, the ACME, and the MLP head into an adaptive multi-modal hybrid (AmmH) model;
   S6: dividing the multi-modal data set into a training set, a validation set, and a test set in a certain ratio, defining a loss function and an optimizer, and defining a learning rate decreasing manner;
   S7: iteratively training the AmmH model end to end for a plurality of times by using the training set based on a back propagation algorithm, and taking a model parameter value with a highest classification accuracy rate on the test set as a final AmmH model parameter value for subject classification; and
   S8: collecting and preprocessing multi-modal data of a target subject, wherein the multi-modal data of the target subject comprise an IRT image and an US image; and inputting the preprocessed multi-modal data to the trained AmmH model for classification to obtain a category of the target subject.

2. The method according to claim 1, wherein in step S1, the collecting a multi-modal data set of a plurality of subjects specifically comprises the following steps:
   S1.1: collecting IRT images and US images of the plurality of subjects, and acquiring categories of the subjects;
   S1.2: preprocessing the collected IRT images and US images for resizing into a consistent size; and
   S1.3: pairing the IRT images and the US images preprocessed in S1.2 as samples, and taking the categories in S1.1 as sample labels to obtain the multi-modal data set.

3. The method according to claim 1, wherein the constructing HIMEs in step S2 specifically comprises the following steps:
   S2.1: constructing an intra-modal convolutional encoder (CE) to extract a feature from a single modality, thereby obtaining an intra-modal local feature expressed as follows:

$$F_m^{local} = E_m^{Conv}(I_m)$$

wherein m represents an imaging modality, $m \in \{IRT, US\}$; $F_m^{local}$ represents the intra-modal local feature of modality m; $E_m^{Conv}$ represents the intra-modal CE corresponding to modality m; $I_m$ represents an image of modality m; $I_m \in R^{C*H*W}$; $F_m^{local} \in R^{C'*H'*W'}$; C, H, and W represent the number of channels, a height, and a width of the image of modality m; and C', H', and W' represent the number of channels, a height, and a width of a feature map of local features of modality m;

S2.2: constructing a feature embedding layer (FEL); firstly performing a deconvolution operation on the feature map obtained in S2.1 to obtain a desired number and size; then performing a flattening operation on obtained two-dimensional feature maps to obtain one-dimensional token sequences required by an input to the transformer encoder; and then adding positional encoding (PE) to the obtained token sequences, thereby obtaining a final one-dimensional token sequence expressed as follows:

$$F_m^{token} = \text{Flatten}(Deconv_m(F_m^{local})) + PE_m$$

wherein $F_m^{token}$ represents the one-dimensional token sequence processed by the FEL as the input to the transformer encoder; Flatten represents the flattening operation; $Deconv_m$ represents the deconvolution operation for modality m; $PE_m$ represents PE for modality m; $F_m^{token} \in R^{C''*H''W''}$, $PE_m \in R^{C''*H''W''}$; and C'' and H''W'' represent the number of the one-dimensional token sequences and dimensions corresponding to modality m, respectively; and S2.3: constructing an intra-modal transformer encoder (TE) to perform global modeling on the local features processed by the FEL in S2.2 and to establish a long-distance dependency relationship, wherein the intra-modal TE is composed of L1 intra-modal transformer blocks; each intra-modal transformer block is composed of the following four parts: a layer normalization (LN) layer, a self-attention (SA) layer, an LN layer, and an MLP layer; the MLP is composed of two fully connected layers with Gaussian error linear units (GELU) activation functions; and obtaining a high-level abstract semantic feature with global context information and local information through the IMTE, expressed as follows:

$$F_m = MLP_m(LN(Z_m)) + Z_m, Z_m = SA_m(LN(F_m^{token})) + F_m^{token}$$

wherein $F_m$ represents the high-level abstract semantic feature of modality m finally obtained by the HIME; $MLP_m$ represents the MLP layer; $Z_m$ represents calculation of an intermediate variable; $SA_m(\bullet)$ represents SA calculation; and $F_m \in R^{C''*H''W''}$.

4. The method according to claim 3, wherein in step S2.3, formulas for the SA calculation in the SA layer are as follows:

$$Q_m = W_m^Q * LN(F_m^{token})$$
$$K_m = W_m^K * LN(F_m^{token})$$
$$V_m = W_m^V * LN(F_m^{token})$$
$$SA_m = \text{softmax}\left(\frac{Q_m K_m^T}{\sqrt{d_k}}\right) V_m$$

wherein $Q_m$, $K_m$, and $V_m$ represent a query vector, a key vector, and a value vector needed by the SA calculation, respectively; $W_m^Q$, $W_m^K$, and $W_m^V$ are all learnable parameters; $LN(\bullet)$ represents layer normalization; T represents transposition of a matrix; $d_k$ represents dimensions of the query vector $K_m$; and a calculation formula for softmax($\bullet$) is $$\text{softmax}(x) = \frac{e^x}{\sum_{i=1}^k e_i^x},$$

wherein e is a natural constant, and k represents dimensions of vector x.

5. The method according to claim 1, wherein the constructing an ACME in step S3 specifically comprises the following steps:

S3.1: constructing an adaptive modality-weight generation (AMWG) network for customizing a different modality-weight for each case according to actual case situations, wherein the AMWG network is an MLP which is composed of three fully connected layers with rectified linear unit (ReLU) activation functions; an input thereto is the high-level abstract semantic feature $F_m$ of each modality m obtained in step S2.3, and an output is an optimal weight customized for each modality $w_m$; and an AMWG operation process is expressed as follows:

$$(w_{US}, w_{IRT}) = \text{softmax}(MLP_{AMWG}([F_{US}, F_{IRT}]))$$

wherein $w_{US}$ and $W_{IRT}$ represent optimal modality-weights corresponding to modalities US and IRT; $F_{US}$ and $F_{IRT}$ represent the high-level abstract semantic features of the modalities US and IRT, respectively; [•,•] represents a splicing operation; softmax(•) indicates operation results in $w_{US}+w_{IRT}=1$; and $MLP_{AWMG}$ represents an MLP composed of three fully connected layers with ReLU activation functions;

S3.2: constructing an inter-modal transformer encoder (TE) for performing information interaction and adaptive feature fusion on the features from different modalities obtained in S2 and the customized modality-weights obtained in S3.1, specifically comprising:

firstly introducing a learnable parameter vector cls token as a final classification feature, and adding PE as an input to the inter-modal TE, expressed as follows:

$$F^{token} = [cls \text{ token}, w_{US} * F_{US} + w_{IRT} * F_{IRT}] + PE$$

wherein $F^{token} \in R^{(C''+1)*H''W''}$; and the inter-modal TE is composed of L2 inter-modal blocks; each inter-modal block is composed of an LN layer, a multi-headed self-attention (MSA) layer, an LN layer, and an MLP layer; and the MLP layer is composed of two fully connected layers with Gaussian error linear unit (GELU) activation functions.

6. The method according to claim 5, wherein in step S3.2, formulas for SA calculation in the MSA layer are as follows:

$$Q^i = W^{Q^i} LN(F^{token})$$
$$K^i = W^{K^i} LN(F^{token})$$

-continued $$V^i = W^{V^i} LN(F^{token})$$

$$\text{head}^i = SA^i = \text{softmax}\left(\frac{Q^i * K^{i^T}}{\sqrt{d_{k^i}}}\right) V^i$$

$$MSA = W^0[\text{head}^1, \text{head}^2 \ldots \text{head}^N]$$

$$F = MLP(LN(Z)) + Z, Z = MSA(LN(F^{token})) + F^{token}$$

wherein $Q^i$, $K^i$, and $V^i$ represent a query vector, a key vector, and a value vector needed by the SA calculation of the ith head, respectively; $W^{Q^i}$, $W^{K^i}$, $W^{V^i}$, and $W^o$ are all learnable parameters; LN(•) represents layer normalization; $\text{head}^i$ and $SA^i$ represent an SA calculation result of the ith head; $d_{k^i}$ represents dimensions of the query vector $K^i$; and $F \in R^{(C''+1)*H''W''}$.

7. The method according to claim 1, wherein the constructing an MLP head in step S4 comprises the following steps:
S4.1: taking a value F[0] of a first position in the feature vector F obtained in step S3 as an input to the MLP head; and
S4.2: constructing the MLP head which is a fully connected layer with the ReLU activation function; inputting F[0], and outputting the classification result, expressed as follows:

$$cls = MLP\ \text{Head}(F[0])$$

wherein cls is a classification class finally obtained, cls∈{benign, malignant}.

8. The method according to claim 1, wherein the loss function in step S6 is cross entropy (CE) Loss, which is defined as follows:

$$CE\ \text{Loss} = -[y\log(y') + (1-y)\log(1-y')]$$

wherein y represents a true label for a sample, and y' represents a predicted label.

9. The method according to claim 1, wherein in step S6, the optimizer is configured to update and calculate a network parameter that affects model training and model output, such that the network parameter approaches or reaches an optimal value, thereby minimizing or maximizing the loss function; and the learning rate decreasing manner refers to a learning rate decreasing with an increased number of training iterations to help model convergence.

10. The method according to claim 1, wherein the preprocessing in step S8 is performed in a same way as that mentioned in S1.2.

11. The method according to claim 1, wherein the subject is thyroid nodule.

12. A multi-modal system for classifying a subject based on ultrasound and infrared thermal images, comprising a processor and a memory having program codes containing an adaptive multi-modal hybrid (AmmH) model stored therein,
wherein the AmmH model comprising: two hybrid intra-modal encoders (HIMEs) configured to extract features from an infrared thermal (IRT) image and an ultrasound (US) image respectively; an adaptive cross-modal encoder (ACME) configured to perform adaptive feature fusion on the features of the IRT image and the US image; and a multilayer perceptron (MLP) head configured to classify the fused feature, and the processor performs the stored program codes to:
S1: receiving a multi-modal data set of a plurality of subjects, the multi-modal data set comprising IRT images and US images;
S2: dividing the multi-modal data set into a training set, a validation set, and a test set in a certain ratio, defining a loss function and an optimizer, and defining a learning rate decreasing manner;
S3: iteratively training the AmmH model end to end for a plurality of times using the training set based on a back propagation algorithm, and taking a model parameter value with a highest classification accuracy rate on the test set as a final AmmH model parameter value for classification; and
S4: receiving and preprocessing multi-modal data of a target subject, wherein the multi-modal data of the target subject comprise IRT images and US images; and inputting the preprocessed multi-modal data to the trained AmmH model for classification to obtain a category of the target subject.

13. The system according to claim 12, wherein the multi-modal thyroid data set is constructed by following steps:
S1.1: receiving the IRT images and the US images of the plurality of subjects, and acquiring categories of the subjects;
S1.2: preprocessing the received IRT images and US images for resizing into a consistent size; and
S1.3: pairing the IRT images and the US images preprocessed in S1.2 as samples, and taking the categories in S1.1 as sample labels to obtain the multi-modal data set.

14. The system according to claim 12, wherein the HIMEs are constructed by following steps:
constructing an intra-modal convolutional encoder (CE) to extract a feature from a single modality, thereby obtaining an intra-modal local feature expressed as follows:

$$F_m^{local} = E_m^{Conv}(I_m)$$

wherein m represents an imaging modality, m∈{IRT, US}; $F_m^{local}$ represents the intra-modal local feature of modality m; $E_m^{Conv}$ represents the intra-modal CE corresponding to modality m; $I_m$ represents an image of modality m; $I_m \in R^{C*H*W}$; $F_m^{local} \in R^{C'*H'*W'}$; C, H, and W represent the number of channels, a height, and a width of the image of modality m; and C', H', and W' represent the number of channels, a height, and a width of a feature map of local features of modality m;
constructing a feature embedding layer (FEL); firstly performing a deconvolution operation on the feature map to obtain a desired number and size; then performing a flattening operation on obtained two-dimensional feature maps to obtain one-dimensional token sequences required by an input to the transformer encoder; and then adding positional encoding (PE) to the obtained token sequences, thereby obtaining a final one-dimensional token sequence expressed as follows:

$$F_m^{token} = \text{Flatten}(Deconv_m(F_m^{local})) + PE_m$$

wherein $F_m^{token}$ represents the one-dimensional token sequence processed by the FEL as the input to the transformer encoder; Flatten represents the flattening operation; $Deconv_m$ represents the deconvolution operation for modality m; $PE_m$ represents PE for modality m; $F_m^{token} \in R^{C''*H''W''}$, $PE_m \in R^{C''*H''W''}$; and C" and H"W" represent the number of the one-dimensional token sequences and dimensions corresponding to modality m, respectively; and constructing an intra-modal transformer encoder (TE) to perform global modeling on the local features processed by the FEL and to establish a long-distance dependency relationship, wherein the intra-modal TE is composed of Li intra-modal transformer blocks; each intra-modal transformer block is composed of the following four parts, a layer normalization (LN) layer, a self-attention (SA) layer, an LN layer, and an MLP layer; the MLP is composed of two fully connected layers with Gaussian error linear units (GELU) activation functions; and obtaining a high-level abstract semantic feature with global context information and local information through the IMTE, expressed as follows:

$$F_m = MLP_m(LN(Z_m)) + Z_m, Z_m = SA_m(LN(F_m^{token})) + F_m^{token}$$

wherein $F_m$ represents the high-level abstract semantic feature of modality m finally obtained by the HIME; $MLP_m$ represents the MLP layer; $Z_m$ represents calculation of an intermediate variable; $SA_m(\bullet)$ represents SA calculation; and $F_m \in R^{C''*H''W''}$.

15. The system according to claim 14, wherein formulas for the SA calculation in the SA layer are as follows:

$$Q_m = W_m^Q * LN(F_m^{token})$$
$$K_m = W_m^K * LN(F_m^{token})$$
$$V_m = W_m^V * LN(F_m^{token})$$
$$SA_m = softmax\left(\frac{Q_m K_m^T}{\sqrt{d_k}}\right)V_m$$

wherein $Q_m$, $K_m$, and $V_m$ represent a query vector, a key vector, and a value vector needed by the SA calculation, respectively; $W_m^Q$, $W_m^K$, and $W_m^V$ are all learnable parameters; $LN(\bullet)$ represents layer normalization; T represents transposition of a matrix; $d_k$ represents dimensions of the query vector $K_m$; and a calculation formula for softmax($\bullet$) is $$softmax(x) = \frac{e^x}{\sum_{i=1}^{k} e_i^x},$$

wherein e is a natural constant, and k represents dimensions of vector x.

16. The system according to claim 12, wherein the ACME is constructed by following steps:

constructing an adaptive modality-weight generation (AMWG) network for customizing a different modality-weight for each case according to actual case situations, wherein the AMWG network is an MLP which is composed of three fully connected layers with rectified linear unit (ReLU) activation functions; an input thereto is the high-level abstract semantic feature $F_m$ of each modality m, and an output is an optimal weight customized for each modality $w_m$; and an AMWG operation process is expressed as follows:

$$(w_{US}, w_{IRT}) = softmax(MLP_{AMWG}([F_{US}, F_{IRT}]))$$

wherein $w_{US}$ and $W_{IRT}$ represent optimal modality-weights corresponding to modalities US and IRT; $F_{US}$ and $F_{IRT}$ represent the high-level abstract semantic features of the modalities US and IRT, respectively; [•,•] represents a splicing operation; softmax(•) indicates operation results in $w_{US}+W_{IRT}=1$; and $MLP_{AWMG}$ represents an MLP composed of three fully connected layers with ReLU activation functions;

constructing an inter-modal transformer encoder (TE) for performing information interaction and adaptive feature fusion on the features from different modalities and the customized modality-weights, specifically comprising:

firstly introducing a learnable parameter vector cls token as a final classification feature, and adding PE as an input to the inter-modal TE, expressed as follows:

$$F^{token} = [cls\ token, w_{US} * F_{US} + w_{IRT} * F_{IRT}] + PE$$

wherein $F^{token} \in R^{(C''+1)*H''W''}$; and the inter-modal TE is composed of L2 inter-modal blocks; each inter-modal block is composed of an LN layer, a multi-headed self-attention (MSA) layer, an LN layer, and an MLP layer; and the MLP layer is composed of two fully connected layers with Gaussian error linear unit (GELU) activation functions.

17. The system according to claim 16, wherein formulas for SA calculation in the MSA layer are as follows:

$$Q^i = W^{Q^i} LN(F^{token})$$
$$K^i = W^{K^i} LN(F^{token})$$
$$V^i = W^{V^i} LN(F^{token})$$
$$head^i = SA^i = softmax\left(\frac{Q^i * K^{iT}}{\sqrt{d_{k^i}}}\right)V^i$$
$$MSA = W^o[head^1, head^2 \ldots head^N]$$
$$F = MLP(LN(Z)) + Z, Z = MSA(LN(F^{token})) + F^{token}$$

wherein $Q^i$, $K^i$, and $V^i$ represent a query vector, a key vector, and a value vector needed by the SA calculation of the ith head, respectively; $W^{Q^i}$, $W^{K^i}$, $W^{V^i}$, and $W^o$ are all learnable parameters; $LN(\bullet)$ represents layer normalization; $head^i$ and $SA^i$ represent an SA calculation result of the ith head; $d_{K^i}$ represents dimensions of the query vector $K^i$; and $F \in R^{(C''+1)*H''W''}$.

18. The system according to claim 12, wherein the MLP head is constructed by following steps:

taking a value F[0] of a first position in the feature vector F as an input to the MLP head; and constructing the MLP head which is a fully connected layer with the ReLU activation function; inputting F[0], and outputting the classification result, expressed as follows:

$$cls = MLP\ Head(F[0])$$

wherein cls is a classification class finally obtained, cls∈{benign, malignant}.

19. The system according to claim 12, wherein the loss function in step S2 is cross entropy (CE) Loss, which is defined as follows:

$$CE\ Loss = -[y\log(y') + (1-y)\log(1-y')]$$

wherein y represents a true label for a sample, and y' represents a predicted label.

20. The system according to claim 12, wherein in step S2, the optimizer is configured to update and calculate a network parameter that affects model training and model output, such that the network parameter approaches or reaches an optimal value, thereby minimizing or maximizing the loss function; and the learning rate decreasing manner refers to a learning rate decreasing with an increased number of training iterations to help model convergence.

* * * * *